United States Patent
Neuberger

(10) Patent No.: US 8,655,130 B2
(45) Date of Patent: Feb. 18, 2014

(54) PRECISELY-SHAPED CORE FIBERS AND METHOD OF MANUFACTURE

(75) Inventor: Wolfgang Neuberger, Dubai (AE)

(73) Assignee: Biolitec Pharma Marketing, Ltd, Ft. Labuan (MY)

( * ) Notice: Subject to any disclaimer, the term of this patent is extended or adjusted under 35 U.S.C. 154(b) by 99 days.

(21) Appl. No.: 13/322,225

(22) PCT Filed: May 27, 2010

(86) PCT No.: PCT/US2010/036451
§ 371 (c)(1),
(2), (4) Date: Nov. 23, 2011

(87) PCT Pub. No.: WO2010/138747
PCT Pub. Date: Dec. 2, 2010

(65) Prior Publication Data
US 2012/0069861 A1    Mar. 22, 2012

Related U.S. Application Data

(60) Provisional application No. 61/181,623, filed on May 27, 2009.

(51) Int. Cl.
*G02B 6/02*    (2006.01)
(52) U.S. Cl.
USPC .......................................................... 385/123
(58) Field of Classification Search
None
See application file for complete search history.

(56) References Cited

U.S. PATENT DOCUMENTS

| | | | | |
|---|---|---|---|---|
| 4,307,938 A | * | 12/1981 | Dyott | 385/123 |
| 5,333,232 A | * | 7/1994 | Yanagawa et al. | 385/127 |
| 5,566,267 A | * | 10/1996 | Neuberger | 385/123 |
| 5,949,941 A | * | 9/1999 | DiGiovanni | 385/127 |
| 6,349,162 B1 | * | 2/2002 | Shiraishi et al. | 385/124 |
| 8,059,930 B2 | * | 11/2011 | Nakai et al. | 385/123 |
| 8,378,255 B2 | * | 2/2013 | Nagashima et al. | 219/121.64 |
| 2001/0019652 A1 | * | 9/2001 | DiGiovanni et al. | 385/123 |
| 2005/0276556 A1 | * | 12/2005 | Williams et al. | 385/123 |
| 2010/0278503 A1 | * | 11/2010 | Nakai et al. | 385/142 |

* cited by examiner

*Primary Examiner* — Sung Pak
(74) *Attorney, Agent, or Firm* — BJ Associates; Bolesh J. Skutnik

(57) ABSTRACT

Non-circular core optical preforms are provided whose core-cladding interface edge has a sharpness that can be accurately controlled according to application-specific needs. Preform design and fiber fabrication is handled such that precisely edged fiber cores are maintained in the drawn fibers. This provides for markedly improved fiber functions, which rely on the non-circular structure of the core. In short, optical fibers having non-circular wave-guiding regions with precise, controlled edges are provided. By using selected manufacturing techniques that employ lower temperatures than commonly used, prior art techniques and by choosing proper materials with appropriate viscosities for core and cladding, the rounding of the edges of the wave-guiding region is precisely maintained in the final optical fibers.

18 Claims, 2 Drawing Sheets

PRECISELY-SHAPED CORE FIBERS AND METHOD OF MANUFACTURE

NATIONAL FILING UNDER 35 USC 371

This application is being filed as a US National stage under 35 USC 371 of PCT Application No. PCT/US10/36451, which was filed May 27, 2010 and also claims the benefit of U.S. Provisional Application Ser. No. 61/181,623 filed May 27, 2009, both of which are incorporated by reference herein.

BACKGROUND OF THE INVENTION

1. Field of the Invention

The present invention relates to optical waveguides, especially glass optical fibers, having a non-circular high refractive index region which is bounded by a lower refractive index region, where the boundary between both regions comprises flat regions with well-defined small radius edges.

2. Invention Disclosure Statement

Fiber lasers are usually based on glass fibers which are doped with laser-active rare earth ions. These ions absorb pump light, typically at a shorter wavelength than the laser or amplifier wavelength, which excites them into some meta-stable levels. This allows for light amplification via stimulated emission. Such fibers are often called active fibers. They are gain media with a particularly high gain efficiency, resulting mainly from the strong optical confinement in the fiber's waveguide structure. Most laser fibers are fabricated by preform-based methods. Most of today's structures involving a preform are realized by modified chemical vapor deposition (MCVD) outside vapor deposition (OVD), Vapor phase axial deposition (VAD), Plasma-activated chemical vapor deposition (PCVD), plasma outside deposition (POD) and direct nanoparticles deposition methods (DND).

In MCVD, a mixture of oxygen, silicon tetrachloride ($SiCl_4$) and other substances such as germanium tetrachloride ($GeCl_4$) is passed through a rotating silica glass tube, which is heated from outside to approximately 1600° C. Chemical reactions in the gas form a fine soot of silica which coats the inner surface of the glass tube near the burner and is sintered into a clear glass layer. The burner is continuously moved back and forth along the tube. Towards the end of the process, the gas mixture is modified to form a layer with higher refractive index, the precursor of the fiber core. Finally, the tube is collapsed by heating it to about 2000° C. and evacuating the interior of the tube such that the outside atmospheric pressure will cause the tube to collapse. There are some drawbacks with the solution doping process: the salts have a tendency to self-associate into chemical structures and thus form easily high local concentration variations into the glass. The porosity of the soot layer is also difficult to control, and subsequently the dopant concentrations. MCVD with solution doping is a multi-step, iterative process yielding a doped core of 2-10 layers. The low number of core layers limits the accuracy and flexibility of doping and refractive index profiles. Also the throughput time is fairly large due to multi-step process and this makes the fiber development work slow and expensive.

OVD is a process where the silica soot is deposited on the surface of some target rod, such as a glass mandrel. Together with the material precursors such as SiCl4, a fuel gas such as hydrogen or methane is supplied to a burner which is again moved along the rotating rod. After the deposition, the target rod is removed, and the preform is consolidated in a furnace, where it is also purged with a drying gas for lowering the hydroxyl content. The atmospheric conditions and the type of burner required yield relatively high temperatures. Therefore, any non circular structure that will be coated by such a technique will become deformed, i.e. the edges will become rounded or even the whole structure will become nearly circular once again.

Vapor phase axial deposition (VAD) is similar to OVD, but uses a modified geometry, where the deposition occurs at the end of the target rod. The rod is continuously pulled away from the burner, and very long preforms can be made. Consolidation of the material can be done in a separate zone melting process. An important difference to OVD and MCVD is that the doping profile is determined only by the burner geometry, rather than by a variation of the gas mixture over time.

Plasma-activated chemical vapor deposition (PCVD) uses deposition inside a tube, similar to MCVD, but significantly different in that soot deposition on the inner wall does not occur; and the power source and temperature are significantly different too. U.S. Pat. No. 6,138,478 by Neuberger et. al. e.g. discloses a device and method for uniform plasma chemical vapor deposition of silica/doped silica onto an elongate substrate to form an optical fiber preform Microwaves instead of a burner are used for heating the deposition region. Initial deposition is slow, but very precise. Furthermore, in contrast to some other techniques, PCVD will result in a clear glass layer. No thermal annealing, sintering, vitrification or similar procedures are required. As the PCVD procedure takes place at low pressure and at a relatively low temperature level, the doping concentration can be varied in a large range of values. When fluorine is the dopant and a pure silica core is the substrate, larger numerical apertures than with most other techniques is achievable.

The preforms for multimode fibers, particularly for large core fibers, are often fabricated using plasma outside deposition (POD), where an outer fluorine-doped layer with depressed refractive index, later forming the fiber cladding, is made with a plasma torch. The core can then be made of pure silica, without any dopant. This procedure uses high temperatures at atmospheric pressure. Thus the non-circular substrate might become deformed.

DND as described by Tamela et. al in proceedings of SPIE Photonics West 2006, Vol. 6116-16 (2006), Integrated Optoelectronical Devices: Optical Components and Materials III, is another process based on the combustion of gaseous and atomized liquid raw materials in an atmospheric oxy-hydrogen flame. Rapid quenching and a short residence time produce a narrow particle-size distribution. The DND burner ensures the proper provision of materials into the flame. The DND process can be described as a special form of outside soot deposition where nanosize particles of dopants are inserted into the target simultaneously with silica deposition. The glass formation and doping stage is followed by sintering, which then results in a solid glass preform. This process is thus a modified nanoscale approach to the older OVD process. The doping and glass formation is done in one step using a DND burner developed for this purpose. The core-index-raising and laser-active rare earth elements are fed in the process in liquid phase directly into the reaction zone. A $SiCl_4$ gas bubbler is used as a source for the silica base of the fiber preform. The glass particles are doped as they form in a fast reaction. After the deposition phase, the alumina mandrel is gently removed from the grown perform and handling tubes are attached to it. The preform is then inserted into a furnace where the first step is drying and cleaning. Finally, the porous glass is sintered into a solid clear core preform. Typical DND preforms are large in diameter and relatively short. This may be useful in making fibers with rectangular or other non-circular cores and claddings, multi-core fibers, or coupled multiple-waveguide fibers. Sintering stage with this method needed to form a solid glass preforms still requires extremely high temperatures.

The temperatures, established in mentioned procedures, easily exceed 1500° C. They can even be as high as 1700° C. and thus close to the melting temperature of (fused) silica, typically the best choice for the core material.

Drawing optical fibers from preforms also presents problems to providing precisely-shaped core fibers, as it commonly uses high temperature ovens operating at temperatures of 1900-2000° C. to draw the actual optical fiber, although the actual temperature of the glass within the drawing 'oven' may be significantly lower.

This presents problems in maintaining preforms with non-circular core shapes, and therefore in obtaining optical waveguides (or fibers) with precisely designed edged cores. Applications with active optical fibers, especially such as fiber lasers, benefit from non-circular pump cores (first cladding) and need edges between a pump core and its cladding which are sharper to obtain higher absorption efficiencies.

Waveguides, especially glass optical fibers with non-circular core regions have proven their use for several years for active fibers. Due to their mode-mixing abilities, core geometries like D-shape, square and octagon shapes are advantageous as pump cores in laser active fibers or for planar waveguides as mode-scrambling cores in beam homogenizing devices to obtain so-called flat-top beam profiles. Such waveguides were not drawn optical fibers.

Hayes et al ("Square core jacketed air-clad fiber" in 30 Oct. 2006/Vol. 14, No. 22/OPTICS EXPRESS 10345", propose silica micro structured fiber technology, in which light is guided via the inclusion of microscopic air tubes for multi-mode, large-core fiber designs. For example, a single ring of air tubes can be used to optically isolate a large fiber core and create a waveguide from a single material. These structures are typically referred to as jacketed air-clad (JAC) fibers. JAC fibers with non-circular core geometry can be tailor made to a specific core size and NA requirement and that sharply defined vertices in the core shape can be preserved throughout the fiber drawing process. They report the fabrication of a JAC fiber with a large square core and show that the near field in this fiber has a top-hat intensity profile. The square core was formed by stacking together many circular silica rods of two different sizes. The advantage of constructing the core region from stacked elements is that it offers enormous design flexibility in terms of the core shape and composition.

In U.S. Pat. No. 4,106,847 by Arnaud, an optical fiber waveguide is disclosed in which cladding surrounds a fiber core having an elliptical fiber core. Optical fibers may thus be less sensitive to bending losses than fibers with circularly symmetric profiles if bending takes place in one preferred plane. However, elliptical shapes are limited for example in their polarization maintaining behavior. In applications such in welding, fibers with a higher symmetry yield a better performance. For some applications the polarisation maintaining behaviour might even be disadvantageous and thus undesired. Welding is such an application. Fibers with a higher symmetry as in the current invention (like square-shaped or octagonal-shaped fiber) can yield a better performance as no polarisation is maintained.

Typical of a group of patents dealing with the enhancement of power development for fiber lasers, by increased efficiency of transferring pump power to the active fiber laser core, selected for this aspect of the background, U.S. Pat. No. 6,157,763 by Grubb et al, U.S. Pat. No. 5,949,941 by DiGiovani, U.S. Pat. No. 5,291,511 by Hanna, and more recently U.S. Pat. No. 6,959,022 by Sandrock et al. present cladding-pumped optical fibers that include a core that includes an active material, a multimode inner cladding, generally called a pump core, disposed about the active core, and a 'second' cladding disposed about the multimode pump core. In many cases, the second cladding is a polymer which is applied as the optical fiber is being drawn. The inner cladding has different shapes, such as rectangular, D-shape, hexagonal, or star-shaped. All of which shapes are hard to establish and maintain precise edges during preform fabrication, if a second cladding is employed, and in all cases especially during standard optical fiber drawing. To reduce problems which might arise from polarizing effects, Sandrock et al. note that the non-circular pump cores should have some symmetry about planes drawn through the fiber center. This aspect can be handled within the new invention described below.

The present invention provides a solution to problems in obtaining and maintaining the preciseness of the edges in non-circular, non elliptical core preforms and drawn optical fibers, as desired and required for various application-specific needs.

OBJECTIVES AND SUMMARY OF THE INVENTION

It is an objective of the present invention to provide a method to manufacture preforms from which fibers with non-circular, non-elliptical cores with well-defined small radius edges are drawn.

It is another objective of the present invention to provide glass optical fibers having a non-circular, core with well-defined small radius edges.

Briefly stated, the present invention provides non-circular, non-elliptical core optical preforms whose core-cladding interface edge has a sharpness that can be accurately controlled according to application-specific needs. Preform design and fiber fabrication is handled such that precisely edged fiber cores are maintained in the drawn. fibers. This provides for markedly improved fiber functions, which rely on the non-circular structure of the core. In short, optical fibers having non-circular wave-guiding regions with precise, controlled edges are provided. By using selected manufacturing techniques that employ lower temperatures than commonly used, prior art techniques and by choosing proper materials with appropriate viscosities for core and cladding, the rounding of the edges of the wave-guiding region is precisely maintained in the final optical fibers.

The above and other objects, features and advantages of the present invention will become apparent from the following description read in conjunction with the accompanying drawings.

DETAILED DESCRIPTION OF THE PREFERRED EMBODIMENTS

Figure 1:
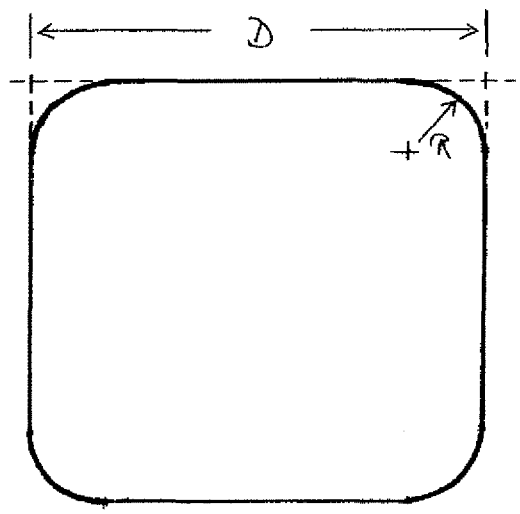
FIG. 1 shows a square core with rounded edges. D is the distance between two opposite parallel surfaces. R is the radius of the rounded edges.

As mentioned earlier most laser fibers are fabricated by preform-based methods. Most of today's structures involving a preform are realized by modified chemical vapor deposition (MCVD) outside vapor deposition (OVD), Vapor phase axial deposition (VAD). Most recently a direct nanoparticles deposition methods (DND), has been proposed.

Less common approaches to preform manufacture involve the use of plasmas, as in Plasma Outside Deposition (POD) and as in plasma-activated chemical vapor deposition method (PCVD), which uses microwave radiation generated plasma under vacuum conditions to deposit cladding material around previously produced pure silica or doped silica core rods. PCVD in these cases yields the deposition of (fluorinated) silica directly from the gaseous phase. The required temperature in PCVD is generally, only about, approximately 1100° C., which is significantly lower than the vitrification or fictive temperatures for the high quality silica core materials and lower than for the above mentioned prior art procedures. On the other hand, deposition rates per minute can be considerably lower than with alternative methods.

To function as a low-loss transmission medium, the fiber needs a cladding, that must have a lower refractive index ($R_i$) than the core material at the core/clad interface. With a pure silica core, this means doped silica for cladding with dopants that lower the $R_i$. Dopants that lower the $R_i$, are primarily F or B; they also make the doped silica have a lower viscosity at any given temperature compared to pure silica, i.e. a lower softening point needed to draw fiber without high stresses. The viscosity of the deposited doped glass layer is lower at every temperature in comparison with the fused silica core. During the fiber drawing procedure, lower temperatures can, thus, be used where cladding material as well as core material becomes drawable, but where the core material is less deformable due to its slightly larger viscosity compared to the cladding material. Often for thicker clad fibers, the outside atomic layers of clad are pure silica like core, but they see the external temperature sooner and more completely than the silica in the inner core. Nevertheless, viscosity of core and clad material must not be too different. Otherwise fiber drawn from such a preform would be too fragile and even might be able form a stable optical fiber structure. The amount of dopant influences the refractive index of the clad and thus the numerical aperture of the fiber. The numerical aperture is a key parameter in many applications. As fluorine lowers the refractive index, the deposition of $F:SiO_2$ on the surface of a $SiO_2$. High numerical apertures (NA) are possible with a $Ge:SiO_2$ doped rod when fluorinated layers are deposited as cladding layers. Germanium increases the refractive index, therefore, a (central) region of $Ge:SiO_2$ forms the core of a waveguide when it is surrounded by $SiO_2$-cladding or $F:SiO_2$-cladding. The latter combination having both core and cladding doped allows for the largest NA all silica optical fibers as both materials have more similar thermal expansions (~viscosities) permitting larger refractive index differences than possible when pure $SiO_2$ is used as the core material.

Pure silica has a very low thermal expansion parameter compared to doped silica. With the PCVD method, thermal mismatch between core material and clad material is moderated by the fact that the plasma causes the clad molecules to imbed a bit into the core, creating an interfacial region which helps transition from core thermal properties to clad thermal properties. On the other hand, the doping level has to be limited to a certain concentration as higher doping might yield (micro-) crystallization which reduces the mechanical strength of the fiber. At the present time this limits a pure silica core, fluorine doped cladding fiber to about NA≤0.30 values.

Square formed fiber optics are useful for high precision work where the delivery of a circular beam is only a partial solution. A square formed fiber core delivering a square formed beam is attractive in various high power applications. For example, in the surface patterning of thin conductive films for the production of flat panel displays, a square beam shape is highly desirable. In order to achieve this, conventional techniques utilize complex, inefficient beam shaping processes to convert the output from delivery fibers/laser systems with circular beams. One way to bypass this additional beam shaping stage is to use a delivery fiber that itself has the desired beam profile. For example, polymer clad fibers with square core. In addition to the numerical aperture restrictions of polymer clad fibers, structural changes take place during fiber drawing where the outer shape of the preform and core experiences a degree of rounding due to the surface tension of the softened glass.

In surface treatment with or without mask a square formed beam is useful. Having a squared image of the laser light directly on the work piece, step and repeat manufacturing is easily implemented. A square or rectangular shape is also useful when coupling light from a diode laser. Due to the often inherently rectangular formed shape of diode laser output, a square or rectangular formed fiber core will couple light more efficiently, thus reducing leakage into the fiber cladding and opening for reduction in the fiber core size. Additionally, a square formed beam can potentially be useful in welding and heat treatment applications, due to the fact that a square formed beam will treat the material more uniformly as it moves laterally along the surface compared to a circular beam. Furthermore, material processing procedure can be performed faster with a square beam profile as less overlapping of single welding points is required than with a circular beam profile. It is also advantageous that mode-mixing capabilities of a square-shaped fiber core yield a "flat top" intensity distribution in comparison with standard multi-mode fibers with a circular core that yields a Gaussian-like intensity distribution. Thus, the overlap of welding points of square shape can be less than the required overlap of circular dots.

There are other industries where a square shaped core optical waveguides and fibers are beneficial in helping narrow the area from which incoming photonic energy can be captured, identified and counted, when necessary. These fields include various areas of spectroscopy and astronomy.

Industries that use fibers with a square shaped core in spectroscopy and/or astronomy applications have been recently found to prefer not to have sharp-edged fibers but fibers with a square-shaped core that has rounded corners. This generally because the sharpest edges tend to be somewhat more lossy due to more cladding modes being formed constantly at extremely flat surfaces. The cladding modes are lost, and if the initial signal is very weak, a normal run to sensors, detectors is such applications will drop out marginal signals reaching the initial surface of the optical fiber.

On the other hand, industries transmitting medium to high power, such as industrial material processing and other high-power laser applications prefer square-shaped laser fibers that have a sharp-edged core. Here the mixing effect and filling of the flat non-circular core with uniform intensities create the ideal 'top hat' output most beneficial and desired in such application fields.

The following examples describe several embodiments of present invention, advantageous for various applications.

When used with diode lasers which give a square-shaped output, the square core fibers offer greater coupling efficiencies and a very homogeneous power distribution on the output end. In laser applications such as surface pre-treatment, materials can be processed in a more uniform fashion than is possible with a circular beam due to less overlapping. FIG. 1 shows a preferred embodiment of present invention consisting of a glass optical fiber with a 4-sided cross section core, preferably a square core, where D is defined as the side length of a flat surface in a structure with perfectly sharp edges and R is defined as the radius of the circle that can be used to describe the rounding of the edges. Tolerance R/d is a parameter indicating the rounding of the edges. ΔR is the standard deviation with respect to the rounding of all edges in a given fiber core. While it might be feared that the small deposition rates, and hence the longer exposure to the significant deposition temperature might compromise the values of R/D and ΔR/R achievable, we found that surprisingly good values were achievable, and preciseness of the edges are controllable, as required by specific applications, with the low temperatures used in the new PCVD. For optical waveguides to work in a reliable and consistent manner in high power applications, such as welding or marking, it was found that small values of at least one of them are desirable. In this embodiment, the R/D ratio is less than 10%, preferably less than 1%.

Figure 2:
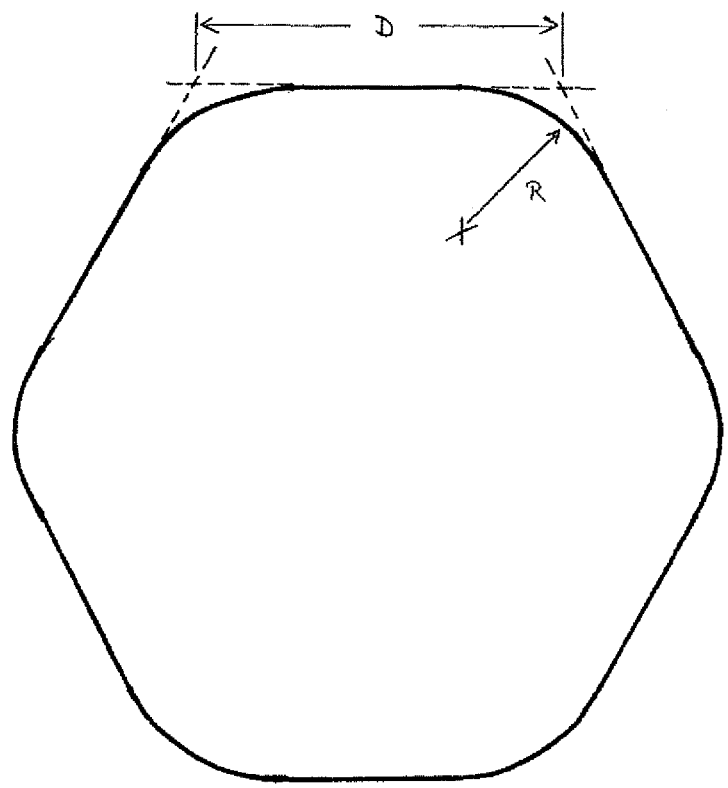
FIG. 2 shows a hexagonal core with rounded edges. D is the side length of a regular hexagon with perfectly sharp edges. R is the radius of the rounded edges.

In a second preferred embodiment, the core of glass optical fiber is of hexagonal shape, as shown in FIG. 2, where R/D is preferably less than 40%. In other variations of this embodiment, R/D is less than 20% and even more preferably less than 10%.

Figure 3:
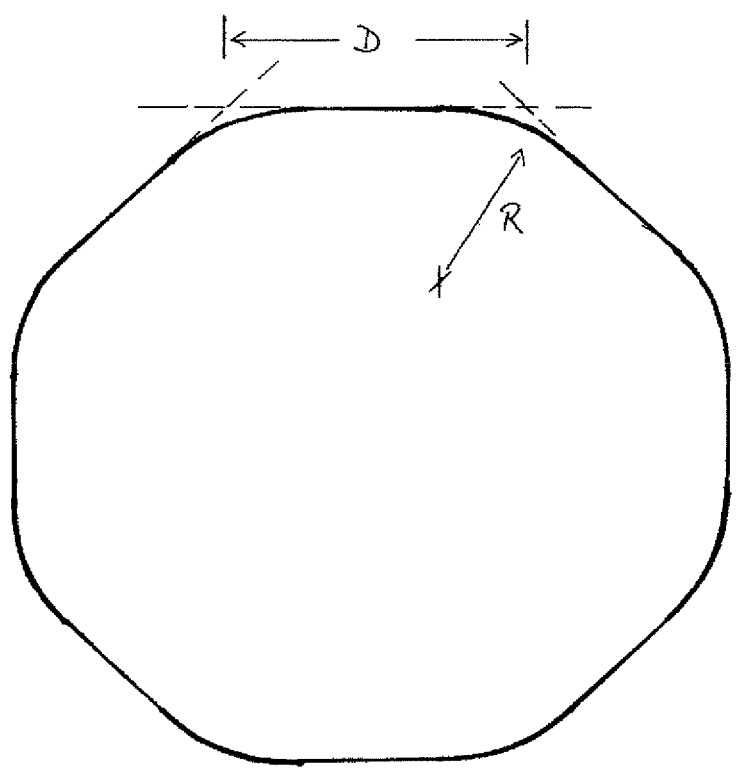
FIG. 3 shows an octagonal core with rounded edges. D is the side length of a regular octagon with perfectly sharp edges. R is the radius of the rounded edges.

In another preferred embodiment, depicted in FIG. 3, the core of glass optical fiber is of octagonal shape. Once again, R/D is less than 40%, preferably less than 20% and even more preferably less than 10%.

In another preferred embodiment, the core of a glass optical fiber is of square shape and R/D is not less than 10% as the use of smaller R/D values would yield stronger mode-mixing and extraction of optical power from the core into cladding modes.

Sharp edges result in the formation of cladding modes which are modes outside the core or very close to the core/cladding interface. Over modest to long lengths the cladding modes are generally depleted because jackets, which mechanically protect optical fibers usually have refractive indexes greater than the cladding materials. So in some applications in astronomy or spectroscopy require mode-mixing but cannot tolerate loss of power or generation of cladding modes. Power losses should be minimized since only low input power level is available (e.g. collecting light from distance stars). Excessive cladding modes, or continual creation of significant cladding modes, cannot be accepted as they would reduce the resolution of the experiment/instrument. Those applications would use fibers with polyimide or acrylate jackets, which, due to the high refractive index of those coating materials, cause cladding modes to propagate very short distances before being attenuated out.

In applications where signals (power) are small, thus like many spectroscopic applications or ones in astronomy tracking, sensing distant stars, the added rise in cladding modes due to extremely sharp edges can be a disadvantage. Precise edges and uniformly flatness along their sides are desirable, even in these applications. The benefit of the present invention lies in an ability to maintain selected (desired) preciseness of the non-circular, non-elliptical edges to get desirable mode-mixing without excessive loss to cladding modes formed as the signal is mode mixed.

In high-power applications like material processing sharp edges might be more important than avoiding cladding modes. Often, the use of silicone or Plastic Hard Clad as coating materials is preferred because those materials have a low refractive index. Therefore, radiation is confined to the glass structure of the fiber and leakage, which might cause damage to the fiber at high power levels, is avoided.

In another preferred embodiment, glass optical fiber core is made from fused silica. The core is a multimode core whose non-circular geometry allows for mode-mixing.

Non-circular core silica optical fibers offer good image scrambling and low focal ratio degradation to improve image processing. When used with diode lasers that give rectangular-shaped output, fibers provide homogeneous power distribution on output end. Square output beam reduces the need for beam shaping optics.

In astronomy a star is tracked over time with the spectrum being transmitted to a spectrometer. A square fiber offers a more stable means of transmission than that of a circular core fiber as the spatial power distribution is more constant. Good image scrambling is characteristic of the square core fiber and together with its low focal ratio degradation (FRD) improves image processing making them ideal for astronomy applications.

In another preferred embodiment, the glass optical fiber is a so-called laser-active double clad fiber. Such a fiber comprises a laser active core which is made from rare-earth-doped glass, is circular and whose diameter size and numerical aperture allow for single-mode-operation. This laser-active core is surrounded by a so-called pump core which in turn is surrounded by additional/second cladding material. The pump core has a lower refractive index than the laser-active core and a higher refractive index than the second cladding. Thus the pump core acts as a cladding for the laser active core. Pump radiation of a (low brightness) pump source is launched into the pump core. According to this embodiment, the pump core is preferably of a non-circular geometry, as such a shape allows for more efficient excitation of the rare earth ions, doped into the laser-active core.

Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. A device comprising:
a waveguide structure with at least one high refractive index region which is surrounded by a region with a lower refractive index;
wherein said high refractive index region has a non-circular, non-elliptical, cross section geometry with a precisely defined shape and precisely defined edges;
wherein a viscosity of a material for said high refractive index region is larger than a viscosity of a material for the region with the lower refractive index; and
wherein said waveguide structure is an optical fiber.

2. The device according to claim 1 wherein said optical fiber is a glass optical fiber, made from silica.

3. The device according to claim 1, wherein said high refractive index region has a 4-sided cross section, which is essentially rectangular, with two side lengths, $D_1$, and $D_2$, with $D_1 < D_2$, and a radius, R, of rounding between adjacent sides; and
wherein the shorter side length $D_1$ and radius of the rounding of the edge, R, have a ratio of $R/D_1 \leq 10\%$.

4. The device according to claim 3, wherein said ratio $R/D_1$ is $\leq 1\%$.

5. The device according to claim 3, wherein said high refractive index region has a square cross sections where side lengths, $D_1 = D_2 = D$, and a radius, R, of rounding between adjacent sides; and wherein the side length D and radius of the rounding of the edge, R, have a ratio of R/D≤10%.

6. The device according to claim 5, wherein said ratio R/D is ≤1%.

7. The device according to claim 1, wherein said high refractive index region has a regular hexagonal cross section with a side length of D and a radius, R, of rounding between adjacent sides; and wherein the side length D and radius of the rounding of the edge, R, have a ratio of R/D≤40%.

8. The device according to claim 7, wherein said ratio R/D is ≤10%.

9. The device according to claim 1, wherein said high refractive index region has a regular octagonal cross section with a side length of D and a radius, R, of rounding between adjacent sides; and wherein the side length D and radius of the rounding of the edge, R, have a ratio of R/D≤40%.

10. The device according to claim 9, wherein said ratio R/D is ≤10%.

11. An optical preform comprising:
a structure with at least one high refractive index region which is surrounded by a region with a lower refractive index;
wherein said at least one high refractive index region has a non-circular, non-elliptical, cross section geometry with a precisely defined shape and precisely defined edges, which is formed from a preselected precisely defined shape;
wherein a viscosity of said at least one high refractive index region is larger than a viscosity of the region with the lower refractive index; and,
which can be drawn into a waveguide structure according to claim 1.

12. The optical preform according to claim 11, whose non-circular, non-elliptical cross section geometry is a precisely defined shape selected from the group consisting a square, a rectangle, a regular hexagon and a regular octagon.

13. The device according to claim 1 wherein said lower refractive region is surrounded by a further region of a different refractive index and wherein said optical fiber is a laser-active double clad fiber;

wherein said non-circular, non-elliptical, high refractive index region surrounds a region with an even higher refractive index, which is substantially circular, and that is doped with rare earth ions to permit laser action; and wherein optical radiation is launched into said non-circular region and is used to excite said rare earth ions wherein said device functions as a fiber laser or as a fiber amplifier.

14. A method of producing a fiber device according to claim 1 comprising; using a drawing temperature significantly lower than a melting temperature of the non-circular core material having said at least one high refractive region.

15. The method of claim 14 wherein said fiber device's at least one high refractive index region has a 4-sided cross section, which is essentially rectangular, with two side lengths, $D_1$, and $D_2$, with $D_1<D_2$, and a radius, R, of rounding between adjacent sides; and wherein the shorter side length $D_1$ and radius of the rounding of the edge, R, have a ratio of R/D1≤10%.

16. The method of claim 15 wherein said at least one high refractive index region has a square cross sections where side lengths, D1=D2=D, and a radius, R, of rounding between adjacent sides; and wherein the side length D and radius of the rounding of the edge, R, have a ratio of R/D 10%.

17. The method of claim 14 wherein said fiber device's at least one high refractive index region has a regular hexagonal cross section with a side length of D and a radius, R, of rounding between adjacent sides; and wherein the side length D and radius of the rounding of the edge, R, have a ratio of R/D 40%.

18. The method of claim 14 wherein said fiber device's at least one high refractive index region has a regular octagonal cross section with a side length of D and a radius, R, of rounding between adjacent sides; and wherein the side length D and radius of the rounding of the edge, R, have a ratio of R/D 40%.

* * * * *